Patented June 20, 1939

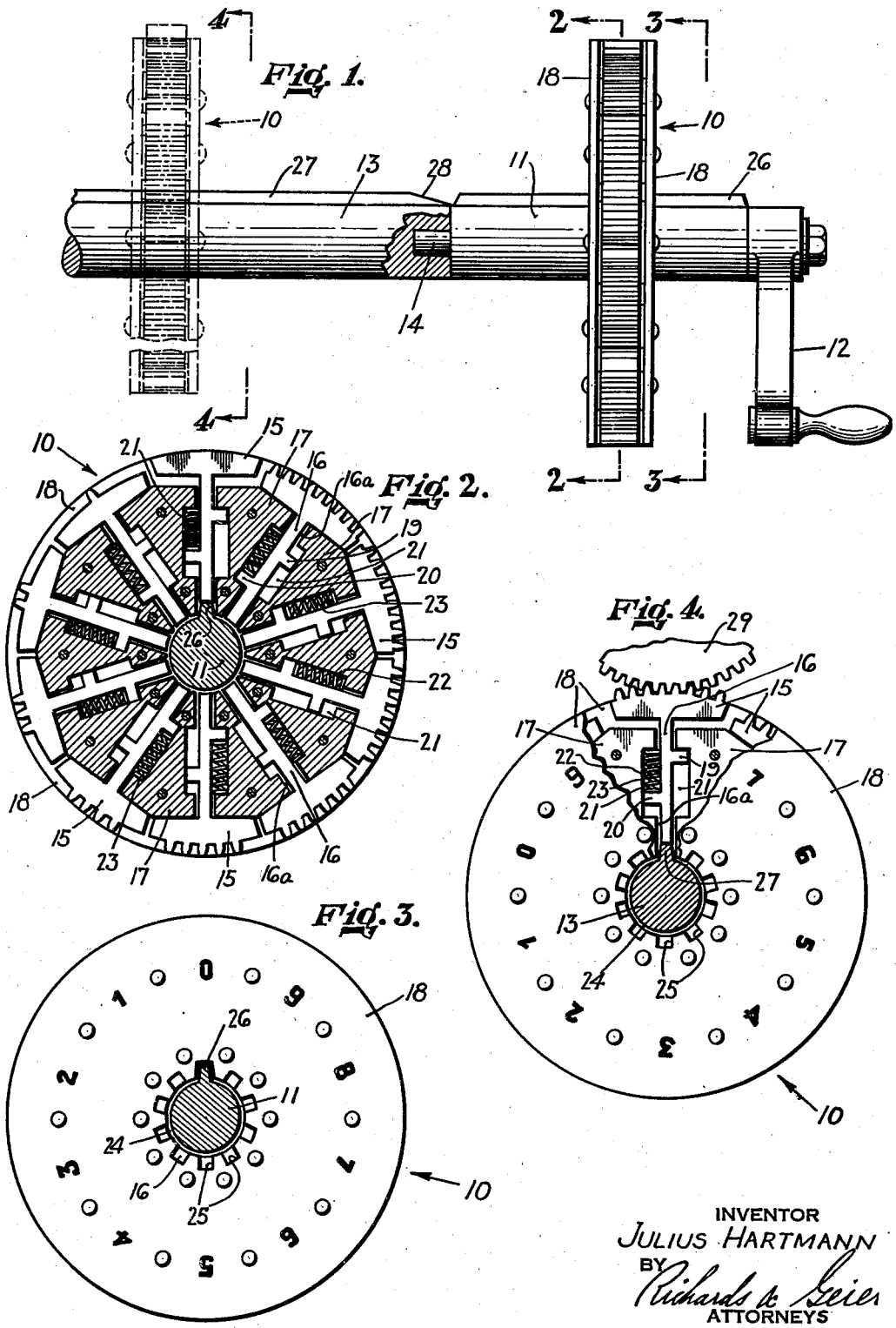

2,163,277

UNITED STATES PATENT OFFICE 2,163,277

GEAR CONSTRUCTION

Julius Hartmann, Irvington, N. J.

Application April 5, 1938, Serial No. 200,118

6 Claims. (Cl. 74—435)

This invention relates to gear drives and the like and more particularly to a gear construction for the transmission of power to machines and devices operated intermittently or in cycles of successive operations.

One of the principal objects of the invention is to provide a gear construction of the character indicated by means of which the intermittent motion may be controlled.

Another object is, to provide a mechanical movement for producing an intermittent rotary motion in which the engaging teeth of the driving wheel may be exchanged automatically to regulate the duration of the intermittent motion.

A further object is to provide a gear wheel in which the teeth are radially adjustable.

Other objects and advantages inherent in the invention will become apparent as the specification proceeds and when taken in conjunction with the accompanying drawing illustrating a preferred embodiment of the invention. It will be understood, however, that the disclosure is made by way of example only and not by way of limitation and it will be apparent that various modifications may be made within the scope of the appended claims.

In the drawing:

Figure 1 is a side elevation of a gear construction according to the invention.

Figure 2 is a section along the line 2—2 of Figure 1.

Figure 3 is a view taken along the line 3—3 of Figure 2, and

Figure 4 is a view partly in section taken along the line 4—4 of Figure 1.

Referring to the various views, the invention comprises a gear wheel generally indicated at 10 and which is slidably mounted on the shaft 11. The shaft 11 may be rotated by means of the handle 12, and engages another shaft 13 for the purpose of which will hereinafter be explained. The two shafts 11 and 13 are individually and separately rotatable and the pin 14 serves merely to keep them in alignment.

Referring in greater detail to the construction of the gear wheel 10, it comprises a plurality of toothed segments 15 arranged about the periphery of the wheel. Each segment is provided with a pin 16 which is reciprocable in slots 16a formed by the adjacent blocks 17, and the upper combined surfaces of which form a polygonal figure, against which the segments 15 abut when the latter rest in their inoperative position.

The blocks 17 are riveted or otherwise held in position between the flanges 18. The periphery of these flanges is formed on the same circle with the tips of the teeth of the segments in their inoperative position, so that the tips of the teeth will be flush with the periphery of the flanges 18.

The pins 16 are reciprocable beween the blocks 17 within the limits of the stops 19 and 20 which are accommodated in respective recesses 21 and 22 of the blocks.

The compression spring 23 serves to hold the pin and its toothed segment resiliently in inoperative position in the wheel. One end of the spring abuts against the outer shoulder of the recess 22 and the other against the stop 20. In inoperative position the stop 20 abuts against the inner shoulder of the recess 22. In operative position, on the other hand, the stop 19 abuts against the outer shoulder of the recess 21.

The stops 19 and 20 are therefore so arranged with respect to the recesses 21 and 20 that the space within which they can move, corresponds approximately to the depth of the teeth of the segments 15. The pins 16 are of such length that when in inoperative position they will be just out of contact with either of the shafts 11 or 13.

The flanges 18 are provided with a central opening 24 to permit the wheel to be mounted on either of the shafts 11 or 13. This central opening is in turn provided with indentations 25 corresponding with the pins 16.

The shaft 11 is provided with a key 26 which fits the notches 25 of the flanges to prevent rotary movement of the wheel with respect to the shaft.

The shaft 13 is provided with a similar key 27 which is beveled at 28 for the purpose which will hereinafter be described.

The various segments 15 are provided with a different number of teeth. In the example illustrated in the drawing, one of the segments is entirely devoid of teeth and for the purpose of identification, this segment is preferably numbered 0 as shown in Figure 3. The other segments are numbered progressively from 1 to 9, and each is provided with a corresponding number of teeth. It will be understood, however, that the number of teeth and their ratio does not in any manner restrict the invention.

In practice it is preferable to mount the wheel 10 on the shaft 11 so that the key 26 projects into the slot 16a corresponding to the 0 segment and pin. The key will thus project the pin 16 and the 0 segment but as the latter has no teeth, no engagement can be made with any other gear. This neutral position of the wheel, of course, may be eliminated if desirable, without affecting the invention and instead it may be made the number 1 segment which would increase the number of operative segments.

When it is desired to intermesh one of the segments with another gear 29 (shown only in Figure 4) for the purpose of imparting an intermittent or cyclic motion thereto, the wheel 10 is turned with the shaft 11 until the one of the indentations 25, which corresponds to the segment selected, is in registry with the key 27. The wheel 10 is then slid onto the shaft 13 to its operative position shown in broken lines in Figure 1, and the bevel 28 will be raised by the corresponding pin 16 to project the segments.

If engagement with another segment is desired, the wheel is simply slid back to shaft 11 with the 0 notch engaging the key 26 and turned until the selected notch and segment are in registry with the key 27. The wheel is then slid onto the shaft 13.

It will be understood that either the shaft 13 or the gear 29 may be connected to a driving source which is not shown in the drawing, and forms no part of the invention. In the former case, the intermittent motion would be imparted to the gear 29 to move it the space corresponding to the number of teeth of the engaging segment, and in the latter case the intermittent motion would be imparted to the wheel 10.

It will also be understood that if the wheel 10 is of light construction, it may be changed on the shaft 13 by hand and then the shaft 11 may be eliminated.

What is claimed is:

1. In a gear drive for intermittent transmission of power, a shaft, a gear wheel having a central opening for receiving said shaft and comprising a plurality of toothed and radially reciprocable sectors, a radial extension projecting from each of said sectors toward said central opening, and means on said shaft for selectively engaging said radial extension and projecting said toothed sectors to individually engage another gear.

2. In a gear drive for intermittent transmission of power, a shaft, a longitudinal projection on said shaft, a gear having a central opening for removably receiving said shaft and comprising a plurality of radially reciprocable toothed sectors, each of said sectors being adapted to individually engage said projection whereby the selected sector will be projected for engagement with another gear, and means for keying said first-mentioned gear wheel on said shaft in the selected position to be rotated thereby.

3. In a gear drive for intermittent transmission of power, a shaft, a longitudinal projection on said shaft, a gear wheel having a central opening for receiving said shaft and comprising a plurality of radially reciprocable toothed segments having radial pins normally terminating in said central opening, said central opening being provided with a plurality of slots corresponding to said pins for engaging said longitudinal projection to key said wheel to said shaft, and whereby said sectors may be selectively projected to engage another gear.

4. In a gear drive for intermittent transmission of power, a pair of individually rotatable shafts in longitudinal alignment, a gear wheel having a central opening for slidably engaging said shafts, said gear wheel comprising a plurality of radially reciprocable toothed sectors normally in retracted position, means on one of said shafts for keying said wheel thereon whereby said sectors may be turned to a selected position with respect to the other shaft, and means on said other shaft to engage said wheel to rotate therewith and project the selected sector when said wheel is slid on to said other shaft.

5. A gear wheel for intermittent transmission of power, comprising the combination with a shaft having a projecting longitudinal key, a pair of flanges having a central opening for slidably engaging said shaft, said opening being provided with a series of circumferential slots for receiving said key, a plurality of segments with different numbers of teeth for transmitting motions of different duration, each being provided with a radial pin reciprocably mounted between said flanges and fitting in one of said slots, means normally keeping said segments retracted within the periphery of said flanges, said pins being adapted to engage said key when said wheel is received upon said shaft to project the teeth of the selected segment side of the periphery of said flanges for engagement with another gear.

6. In a gear drive for intermittent transmission of power, a pair of individually rotatable shafts in longitudinal alignment, a gear wheel comprising a pair of spaced concentric flanges having a central opening for slidably engaging said shafts, a plurality of groups of teeth differing in number for transmitting motions of different duration mounted for radial reciprocation between said flanges, means for normally keeping the teeth of said segments retracted within the periphery of said flanges, said wheel being adapted to be turned by one of said shafts to put one of said groups of teeth in a selected position preliminary to sliding said wheel onto said other shaft, and means on said other shaft for projecting the selected group of teeth beyond the periphery of said flanges for engagement with another gear.

JULIUS HARTMANN.